United States Patent [19]
Lang

[11] 4,028,997
[45] June 14, 1977

[54] MOTOR VEHICLE STEERING

[75] Inventor: Armin Lang, Schwaebisch Gmuend, Germany

[73] Assignee: Zahnradfabrik Friedrichshafen AG, Friedrichshafen, Germany

[22] Filed: May 2, 1975

[21] Appl. No.: 573,883

[52] U.S. Cl. .................................. 91/412; 60/386; 180/152

[51] Int. Cl.² .................... B62D 5/08; F15B 11/16; F15B 13/06

[58] Field of Search ............... 91/412, 464; 60/386; 180/79.2 B, 79.2, 152; 137/625.66, 625.68

[56] References Cited

UNITED STATES PATENTS

| | | | |
|---|---|---|---|
| 2,236,467 | 3/1941 | Clench | 60/386 X |
| 2,857,976 | 10/1958 | Forster et al. | 180/79.2 |
| 2,930,357 | 3/1960 | Brueder | 91/465 X |
| 3,237,641 | 3/1966 | Audemar | 133/625.66 X |
| 3,520,135 | 7/1970 | Liebert | 60/386 X |
| 3,584,537 | 6/1971 | Schulz | 180/79.2 X |
| 3,765,181 | 10/1973 | Lang | 91/412 X |
| 3,832,849 | 9/1974 | Lang | 91/412 X |

FOREIGN PATENTS OR APPLICATIONS

| | | | |
|---|---|---|---|
| 2,233,624 | 5/1974 | Germany | 180/152 |
| 1,942,086 | 3/1971 | Germany | 180/139 |

*Primary Examiner*—Irwin C. Cohen
*Attorney, Agent, or Firm*—Zalkind & Shuster

[57] ABSTRACT

A fluid power assist type of vehicle steering system having a controlled servo motor assembly operated through a control circuit, and interconnected with the steering linkage, is provided with an auxiliary servo motor assembly through which pressure regulation is effected to prevent vibration otherwise amplified by feedback pressure signals. Differential pressure actuated pilot valves control the supply and return of pressurized fluid to and from the auxiliary servo motor assembly in response to differences between opposing pressures of the servo motor assemblies to regulate only the pressure chambers of the auxiliary servo motor assembly.

11 Claims, 4 Drawing Figures

MOTOR VEHICLE STEERING

This invention relates to a vehicle steering system with a hydraulic type of auxiliary power assist.

Vehicle steering arrangements with two fluid pressure circuits, one of which is controlled independent of the other, are very susceptible to vibrations. In the case of a steering system of this type, as disclosed for example in applicant's U.S. patent application Ser. No. 377,144, filed July 6, 1973, now abandoned, it is proposed to stabilize operation of the steering control valve and thereby steering movements by feedback of operating pressures from the servo circuit to the control valve. Such stabilization is sufficient for average requirements in vehicles which are, for example, steered through a swinging axle arrangement. In the latter type of steering system, pressure regulation of the servo circuit in contrast to the control circuit, is limited to that side of the servo motor having the higher pressure. The other side of the servo motor having the lower pressure is connected without regulation to the reservoir tank. For vehicles with high dynamic steering moments, such as articulated vehicles, the foregoing type of steering system is not suitable since the vibrations produced would be intensified because of high inertia forces.

The present invention is therefore concerned with preventing excessive vibrations in a steering system having two fluid pressure circuits in such a manner that the improvement will be applicable to motor vehicles with higher inertia forces in the steering system. Such high inertia forces are present for example in steering systems associated with large articulated vehicles.

The invention will be explained in more detail on the basis of embodiments shown by way of example in the accompanying drawings, wherein.

Figure 1:
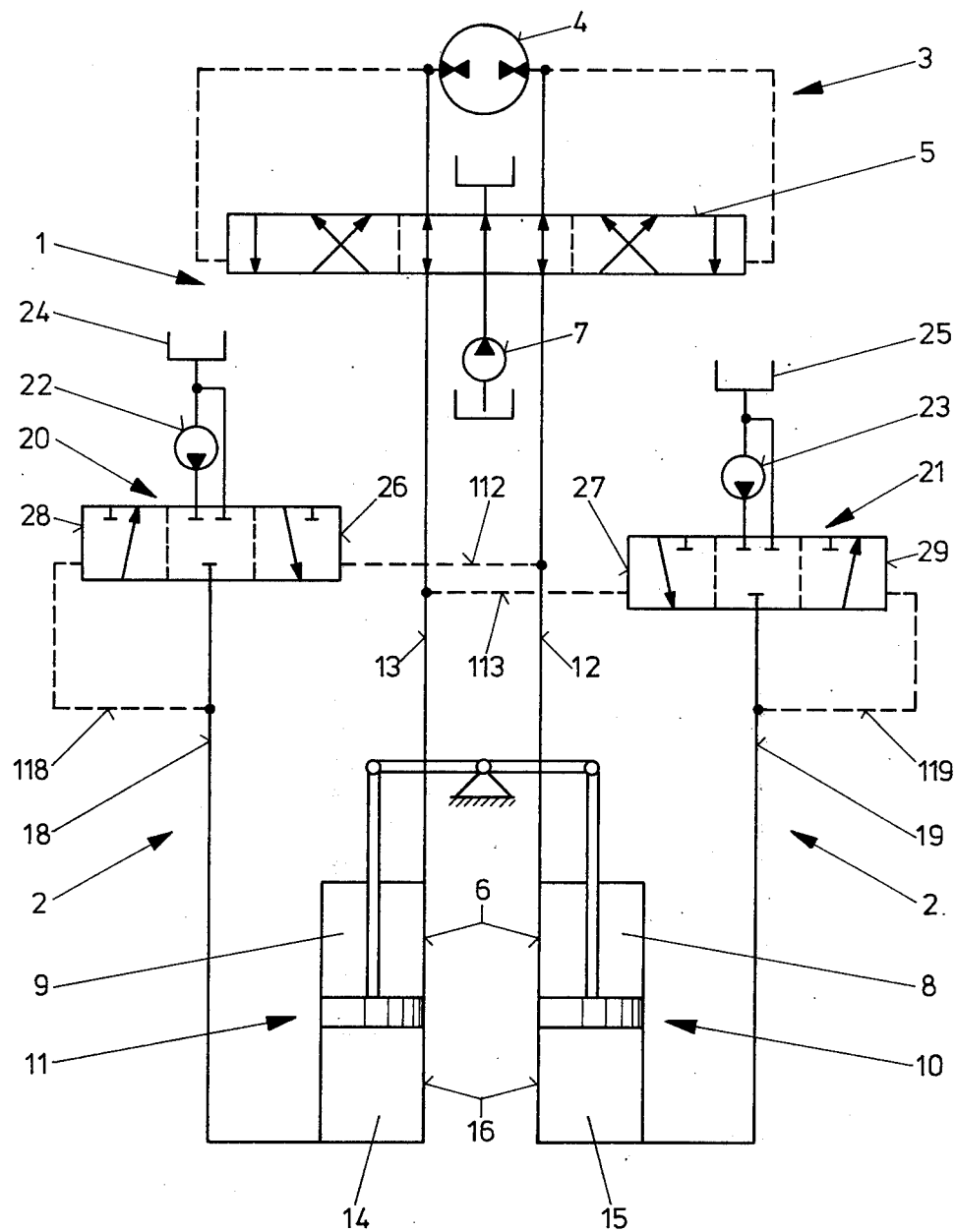
FIG. 1 is a schematic representation of a steering system according to the present invention.

Referring now to the drawings in detail, FIG. 1 illustrates a steering system including as basic components thereof, a control circuit 1 and a servo section 2. The control circuit 1 includes a steering control portion 3 of a known type having a manually-operated control pump 4, a pressure-operated control valve 5 and a controllable servo motor assembly 6. The servo motor assembly 6 is operated by means of a hand steering wheel (not shown) connected to the control pump 4. A power source in the form of a servo pump 7 is provided to augment or power assist the control circuit 1 when needed. The controllable servo motor assembly 6 as shown in FIG. 1 includes two hydraulic cylinders 10 and 11 having pressure control chambers 8 and 9 through which piston rods extend respectively on one side of their associated pistons. The pressure chambers 8 and 9 are connected to the control valve 5 by the fluid lines 12 and 13. The pistons associated with the servo motor assembly 6 have their piston rods interconnected by a steering linkage as diagrammatically shown in FIG. 1.

Two regulated pressure chambers 14 and 15 in the two hydraulic cylinders 10 and 11 on the sides of the pistons opposite chambers 9 and 10, form an auxiliary servo motor assembly 16 in the servo section 2. The pressure chambers 14 and 15 are connected to two servo pilot valves 20 and 21 by means of two fluid pressure lines 18 and 19. The servo pilot valves 20 and 21 are connected to power sources in the form of servo pumps 22 and 23 which may be identical to servo pump 7 and also have fluid reservoir tanks 24 and 25 associated therewith.

Control surfaces 26 and 27 of the servo pilot valves 20 and 21 are continuously exposed to the pressure medium in lines 12 and 13 by means of two control lines 112 and 113. As a result of the fluid pressure forces exerted on the control surfaces 26 and 27, the servo pilot valve 20 or 21, is actuated in such a way that the fluid pressure line 18 or 19 is connected to the servo pump 22 or 23. The other two control surfaces 28 and 29 of the servo pilot valve 20 and 21, are exposed to the pressure of fluid medium in line 18 and 19 by means of two control lines 118 or 119.

The servo pilot valve 20 responds to the differential pressure between the pressure chamber 8 of the controllable servo motor assembly 6 and of the pressure chamber 14 of the auxiliary servo motor assembly 16. Correspondingly, the servo pilot valve 21 responds to differential pressure between the pressure chamber 9 and the pressure chamber 15. Whenever the pressure in the pressure chamber 8 increases during steering movement, a pressure signal is transferred through pressure line 12 and the control line 112 to the control surface 26 of the servo pilot valve 20. If the pressure in the pressure chamber 14 at the same time is lower than that of the pressure in chamber 8, the pressure differential actuates or shifts the servo pilot valve 20 to connect servo pump 22 to pressure chamber 14 through line 18. The lower pressure in chamber 14 is thereby increased until it equals that of chamber 8. Similar adjustment of the pressure in pressure chamber 15 occurs under control of servo pilot valve 21. In the latter case, the pressure chamber 9 of servo motor assembly 6 is connected to the fluid reservoir tank 16. Since this connection is not established directly, but through controllable throttling ports in the control valve 5, regulation of the return pressure from pressure chamber 15 of servo motor assembly 16 is achieved through the action of servo pilot valve 21. Thus, it is possible to regulate the pressures in the pressure chambers 14 and 15 of the servo motor assembly 16 independent of one another.

By various modifications of the servo pilot valves 20 and 21, it is possible to provide steering mechanisms with variable characteristics for different applications and to meet different requirements. The relative size of the control surfaces of the servo pilot valves may, for example, be varied toward that end.

Figure 2:
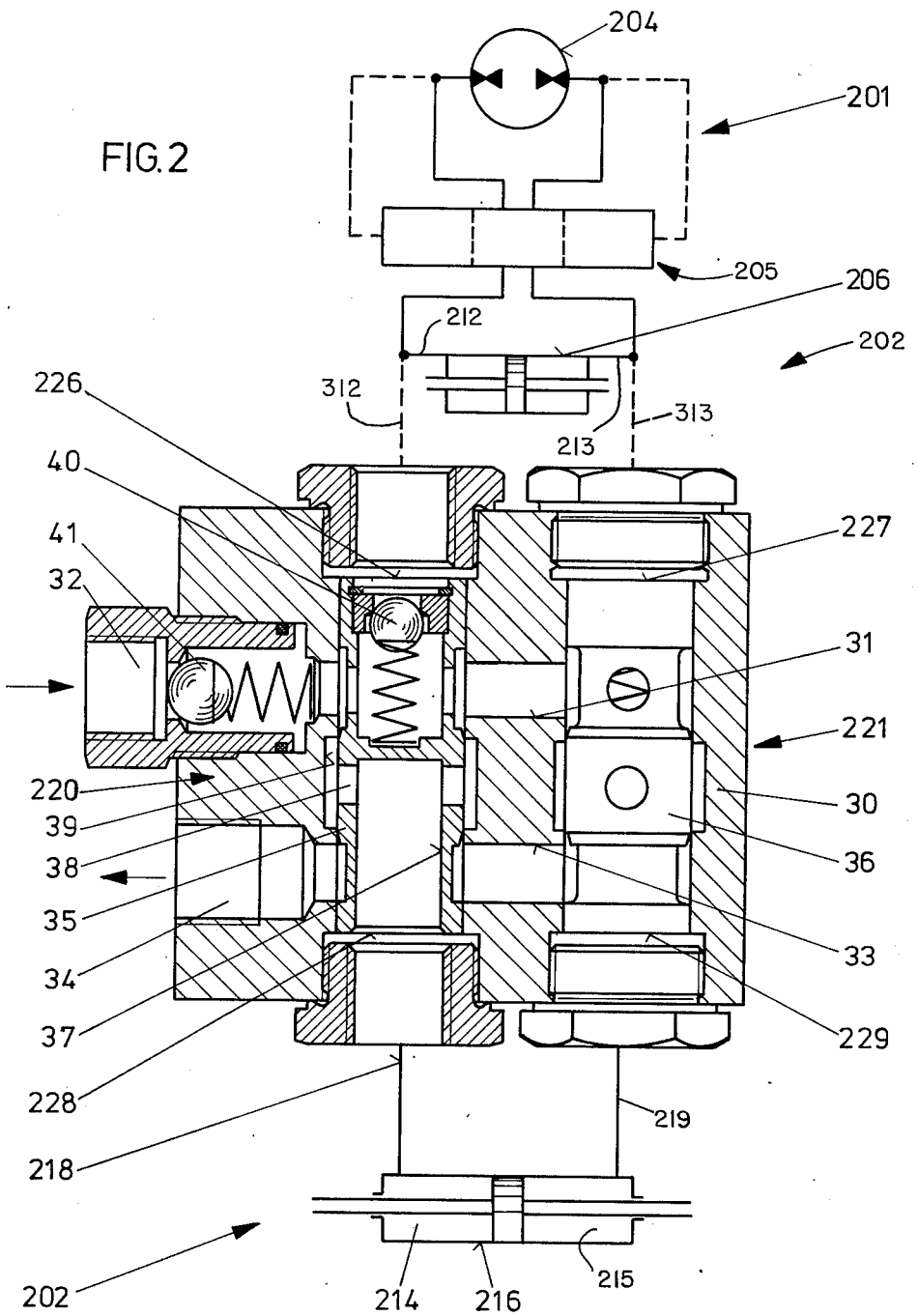
FIGS. 2-4 show specific embodiments of steering systems in accordance with the arrangement diagramed in FIG. 1.

An embodiment of the steering mechanism according to the present invention is shown by way of example in FIG. 2 wherein two servo pilot valves 220 and 221 respectively corresponding to pilot valves 20 and 21 in FIG. 1, are disposed in a common housing 30 shown in section. A common supply passage 31 having an inlet port connection 32 to a source pressurized fluid (not shown) and a common return passage 33 having an outlet port connection 34 to a fluid reservoir tank (not shown) serve both servo pilot valves 220 and 221. The control surface 226 and 227 which are formed by end faces of the valve pistons 35 and 36 located at the top of FIG. 2, are exposed to pressurized fluid from the control valve circuit 201 of the steering mechanism. Two control surfaces 228 and 229 opposing surfaces 226 and 227, are exposed to pressurized fluid from an auxiliary servo motor assembly 216 in the form of a hydraulic cylinder operated from controllable servo motor assembly 206 interconnected therewith in a manner well known in the art and not shown herein. Since the two valve pistons 35 and 36 are identical to each other in structure and function, the details of only valve piston 35 is shown in FIG. 2 wherein all other parts corresponding in function and operation to those shown in FIG. 1 are referred to by the same numeral increased by 200.

The valve piston 35 is provided with axial bore 37 which is connected by pressure fluid line 218 to one pressure chamber 214 of the servo motor assembly 216 and by radial bores 38 with a central control groove 39 formed in the housing 30. Because of the foregoing construction, a separate control line for the control surface 228 of the valve piston 35, is omitted. The servo pilot valve 220 including the valve piston 35 operates in the same manner as hereinbefore described and servo pilot valve 20 depicted in FIG. 1.

In order to insure that the steering system will remain operable even if there is failure of the fluid pressure power source connected to the inlet connection 32, a check valve 40 is disposed in the valve piston 35. By means of this check valve 40, a fluid connection is established between the control circuit 201 and the supply passage 31 so that the servo motor assembly 216 may be operated with a pressure medium through the control groove 39, the radial bores 38 and the axial bore 37 from the control pump 204. A check valve 41 disposed in the inlet connection 32 prevents any escape of control medium displaced by the control circuit 201 toward the power source.

In the neutral position of the valve 220 as shown in FIG. 2, the fluid connection between the supply passage 31 and the servo section 202 is blocked with passage 31 separated by the valve piston 35 from control groove 39. However, the arrangement could be modified by formation of a control groove which is in fluid communication with the supply passage of the valve in its neutral position. The manner in which the control groove is formed and operates will be dependent upon the type of fluid power source utilized and is not further described herein since it is not essential to the invention.

Figure 3:
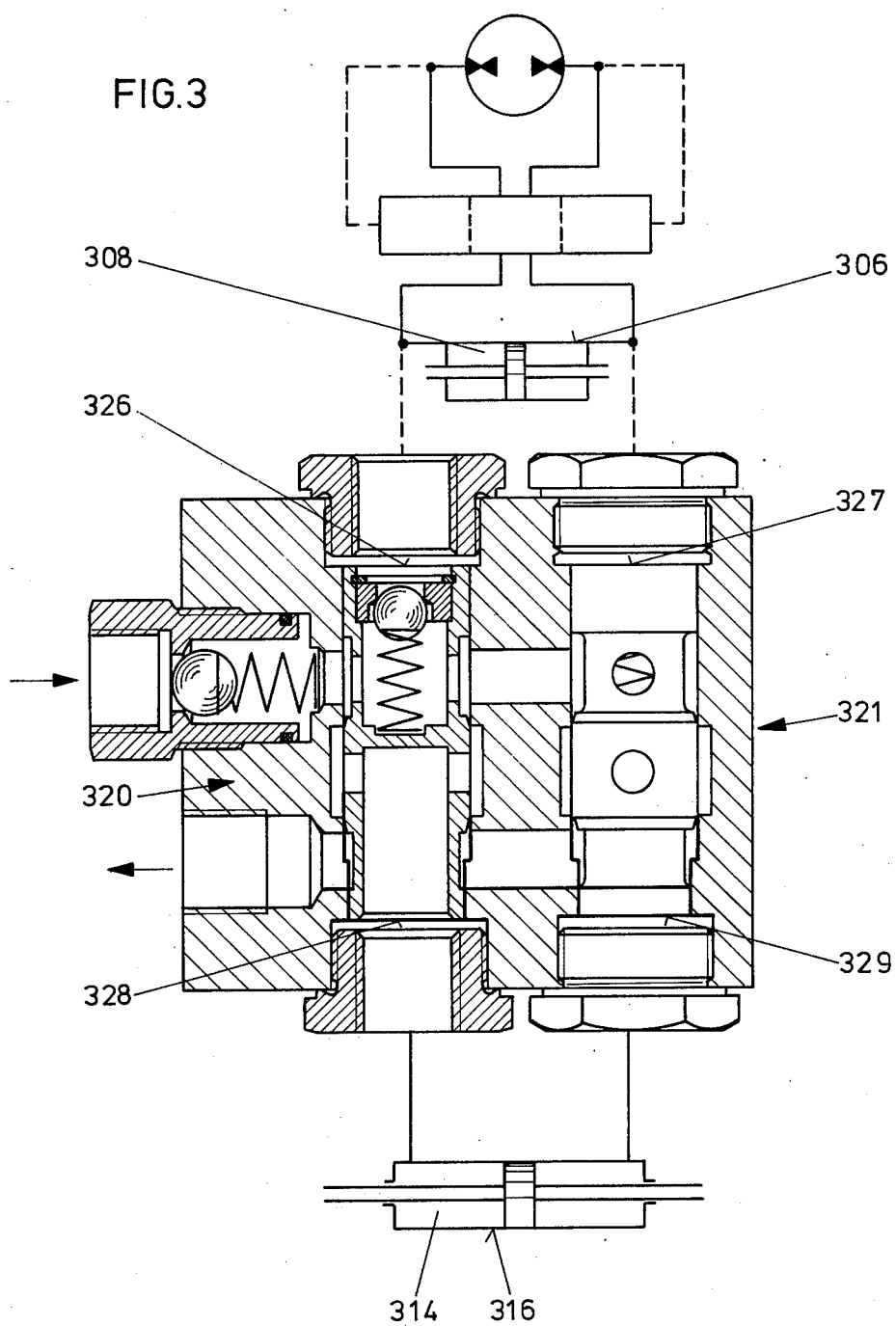

According to the embodiment of FIG. 2, the control surfaces 226 and 228 are of the same size and the pressure in the servo motor assembly 216 is regulated to the level of the pressure in the servo motor assembly 206. If, on the other hand, the control surfaces of the servo pilot valves are made with effectively different cross sections, then the pressure in the auxiliary servo motor assembly may be regulated according to a ratio corresponding to the control surface area ratio. In FIG. 3, the control surfaces 326 and 327 of the servo pilot valves 320 and 321 are larger than the control surfaces 328 and 329. As a result of this surface area difference, the pressure in the pressure chamber 314 of the auxiliary servo motor assembly 316 is increased by an amount equal to the area ratio of the control surfaces 326 and 328. It is thereby possible to regulate the servo section for higher pressures through a control circuit of the steering mechanism designed from smaller pressures. Whenever the pressure in the servo section is regulated for a lower pressure than that of the control circuit by selection of the inverse surface area ratio of the control surfaces, then use of a smaller servo section is made possible for the achievement of a certain value of the auxiliary power assist.

Figure 4:
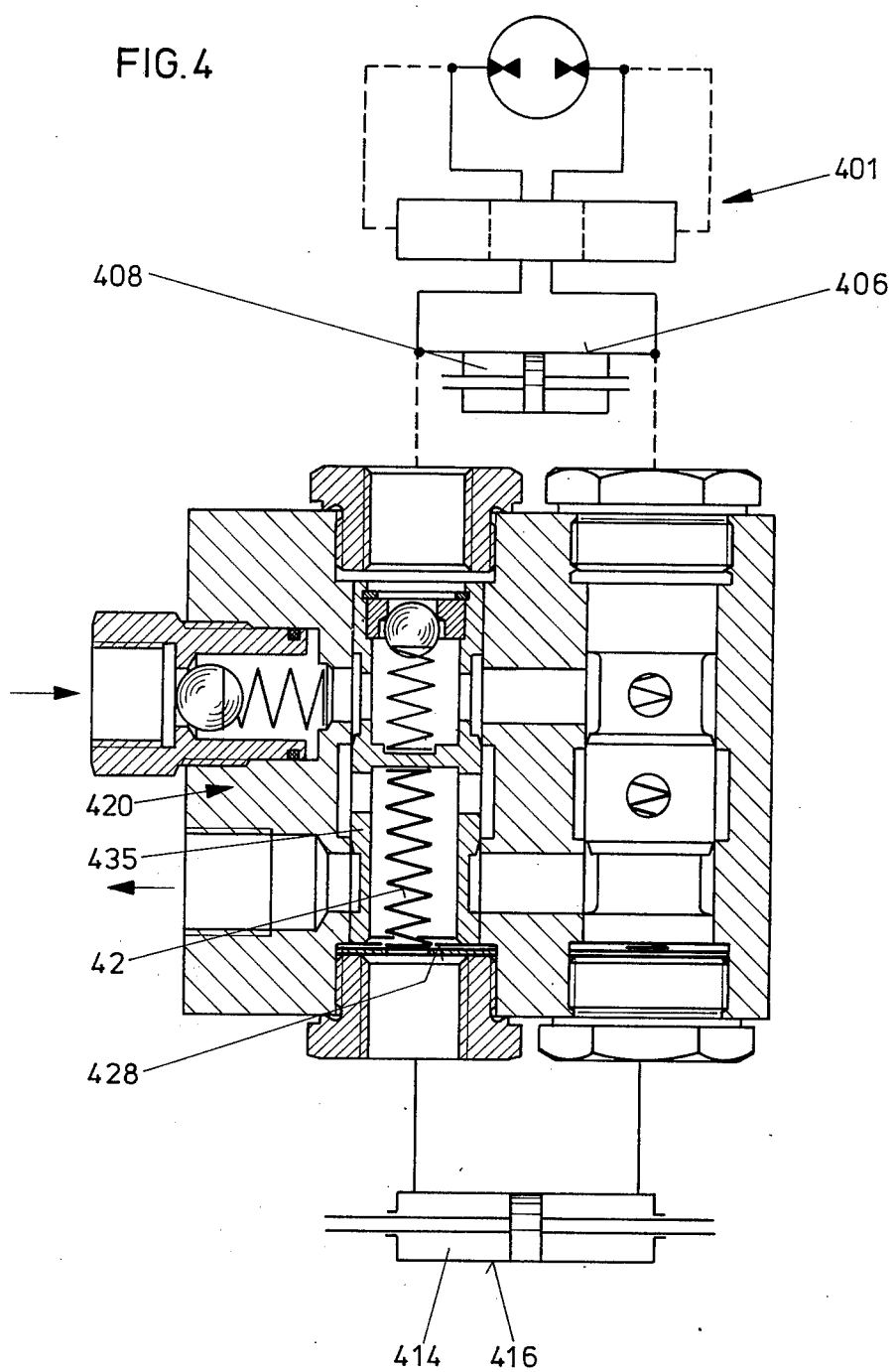

In order to set the pressure either in the control circuit or in the servo section up to a certain value, the two servo values may be continuously biased by means of a pressure spring as shown in FIG. 4. In the embodiment in FIG. 4, the valve piston 435 is loaded by a compression spring 42 so that the pressure in the control circuit 401 is pre-stressed. As a result, servo pilot valve 420 is actuated only when a certain triggering threshold pressure is present. The pressure regulation for the pressure chamber 414 of the auxiliary servo motor assembly 416 will therefore start only after a pressure has built up in the pressure chamber 408 of the controllable servo motor assembly 406 to counter balance the pressure on the control surface 428 and the force of the compression spring 42.

The advantage of the steering arrangement described resides in the fact that both regulation of the supply pressure to the auxiliary servo motor as well as regulation of the return pressure therefrom is made possible in accordance with the corresponding pressures of the controllable servo motors. As a result of the foregoing arrangement, vibrations which occurred because of relatively large inertia forces in some existing steering systems, are prevented.

I claim:

1. In combination with a steering system including a source of pressurized fluid, a control valve (5) connected to said source, servo motor means (6) having pressure control chambers (8 and 9) and fluid pressure lines (12 and 13) connecting said pressure control chambers to the control valve for power assist purposes, means for reducing vibrations produced in the system because of inertia forces, comprising a servo motor assembly (16) having regulated pressure chambers (14 and 15) respectively opposing said pressure control chambers of the servo motor means, a source of pressure medium (22 and 23) connected to said servo motor assembly, and a pair of pilot valve assemblies (20 and 21) responsive to pressure differentials between the pressure control chambers and the regulated pressure chambers for regulating the pressures of the pressure medium in the regulated pressure chambers associated with the servo motor assembly, each of said pilot valve assemblies including a valve piston (35 or 36) having opposed pressure faces (26–28) or 27–29) and a valve body (30) within which the valve piston is movable, conduit means (18 or 19) for establishing fluid communication between one of the pressure faces (28 or 29) and the regulated pressure chamber (14 or 15) opposing one of the pressure control chambers associated with the servo motor means, passage means (12–112 or 12–113) for establishing continuous fluid communication between only the other of the pressure faces (26 or 27) and the other of the pressure control chambers associated with the servo motor means, and ports (32 and 34) establishing fluid communication between the source of pressure medium and the regulated pressure chambers.

2. The combination of claim 1, wherein each of said pilot valve assemblies further includes a control groove (39) formed in the valve body through which fluid communication is established between the regulated pressure chamber and the ports connected to the source of pressure medium.

3. The combination of claim 2, including spring means (42) for biasing the valve piston (435) in one direction.

4. The combination of claim 3, including check valve means (40) in each of the pilot valve assemblies conducting flow in one direction from the control valve to the conduit means for supply of fluid to the regulated pressure chamber in the event of failure of the source of pressure medium.

5. The combination of claim 4, including check valve means (41) for blocking flow in one direction to the source from the regulated pressure chamber.

6. The combination of claim 5, wherein said opposed pressure faces are equal in area.

7. The combination of claim 1, wherein said opposed pressure faces are unequal in area.

8. The combination of claim 1, wherein said opposed pressure faces are equal in area.

9. The combination of claim 1, including check valve means (40) in each of the pilot valve assemblies conducting flow in one direction from the control valve to the conduit means for supply of fluid to the regulated pressure chamber in the event of failure of the source of pressure medium.

10. The combination of claim 1, including check valve means (41) for blocking flow in one direction to the source from the regulated pressure chamber.

11. The combination of claim 1 wherein said pilot valve assemblies are displaceable from neutral positions in which regulated pressure is maintained in the regulated pressure chambers.

* * * * *